US012737537B2

(12) United States Patent
Mante et al.

(10) Patent No.: US 12,737,537 B2
(45) Date of Patent: Sep. 15, 2026

(54) GOVERNANCE AND CONFIDENCE ASSESSMENT OF LLM

(71) Applicant: International Business Machines Corporation, Armonk, NY (US)

(72) Inventors: Warren Nicholas Mante, Sachse, TX (US); Warren Thomas Bloomer Lucas, Middletown, CT (US); Sourav Mazumder, Contra Costa, CA (US); Andrew R. Freed, Cary, NC (US); Stefan A. G. Van Der Stockt, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 184 days.

(21) Appl. No.: 18/585,145

(22) Filed: Feb. 23, 2024

(65) Prior Publication Data

US 2025/0272484 A1 Aug. 28, 2025

(51) Int. Cl.
*G06F 40/20* (2020.01)
*G06Q 30/018* (2023.01)

(52) U.S. Cl.
CPC ........... *G06F 40/20* (2020.01); *G06Q 30/018* (2013.01)

(58) Field of Classification Search
CPC .............................. G06F 40/20; G06Q 30/018
See application file for complete search history.

(56) References Cited

U.S. PATENT DOCUMENTS

| | | | | |
|---|---|---|---|---|
| 10,592,838 | B2 | 3/2020 | Urban | |
| 10,984,283 | B2 | 4/2021 | Aerni | |
| 11,263,550 | B2 | 3/2022 | Vasconcelos | |
| 11,537,875 | B2 | 12/2022 | Kozhaya | |
| 11,568,286 | B2 | 1/2023 | Nourian | |
| 11,714,842 | B1 * | 8/2023 | Sharma | G06F 16/183 707/736 |
| 11,741,302 | B1 * | 8/2023 | Pathak | G06F 40/253 715/271 |
| 11,900,229 | B1 * | 2/2024 | Swope | G06N 5/01 |
| 2019/0279111 | A1 | 9/2019 | Merrill | |
| 2019/0340518 | A1 | 11/2019 | Merrill | |
| 2022/0108222 | A1 | 4/2022 | Brannon | |
| 2022/0114399 | A1 | 4/2022 | Castiglione et al. | |
| 2022/0400094 | A1 * | 12/2022 | Sampath | G06F 40/30 |
| 2023/0281482 | A1 * | 9/2023 | Lantzman | G06N 5/025 706/12 |

(Continued)

FOREIGN PATENT DOCUMENTS

| | | | |
|---|---|---|---|
| CN | 109947088 | B | 9/2020 |
| CN | 116909889 | A | 10/2023 |

*Primary Examiner* — Andrew C Flanders
*Assistant Examiner* — Shashidhar Shankar Manoharan
(74) *Attorney, Agent, or Firm* — Monchai Chuaychoo

(57) ABSTRACT

An approach for governing responses generated by a language learning model (LLM) model. The approach defines a reference set of inputs and output pairs for the LLM wherein the reference set of inputs and output pairs are actual inputs and reference outputs. The approach defines a set of metadata associated with the reference set of input and output pairs and assigns the metadata to each pair of the reference set of inputs and output pairs. The approach also defines a set of evaluation criteria, assigns the evaluation criteria to organizational risk framework and associates the set of metadata to the evaluation criteria.

20 Claims, 8 Drawing Sheets

(56) References Cited

U.S. PATENT DOCUMENTS

| | | | | |
|---|---|---|---|---|
| 2023/0377037 | A1 | 11/2023 | Kamkar | |
| 2024/0127153 | A1* | 4/2024 | Amini | G06Q 10/0635 |
| 2025/0199786 | A1* | 6/2025 | Silver | G06F 8/4441 |

* cited by examiner

200

202 Defining a reference set of inputs and outputs pairs for an LLM

204 Defining a set of metadata associated with the set of inputs and output pairs 206 Assigning the set of metdata to each of the set of inputs and output pairs 208 Defining a set of evaluation criteria related to the LLM 210 Assigning the set of evaluation criteria to an organization risk framework 212 Associating the set of evaluation criteria to the set of metadata Next Page

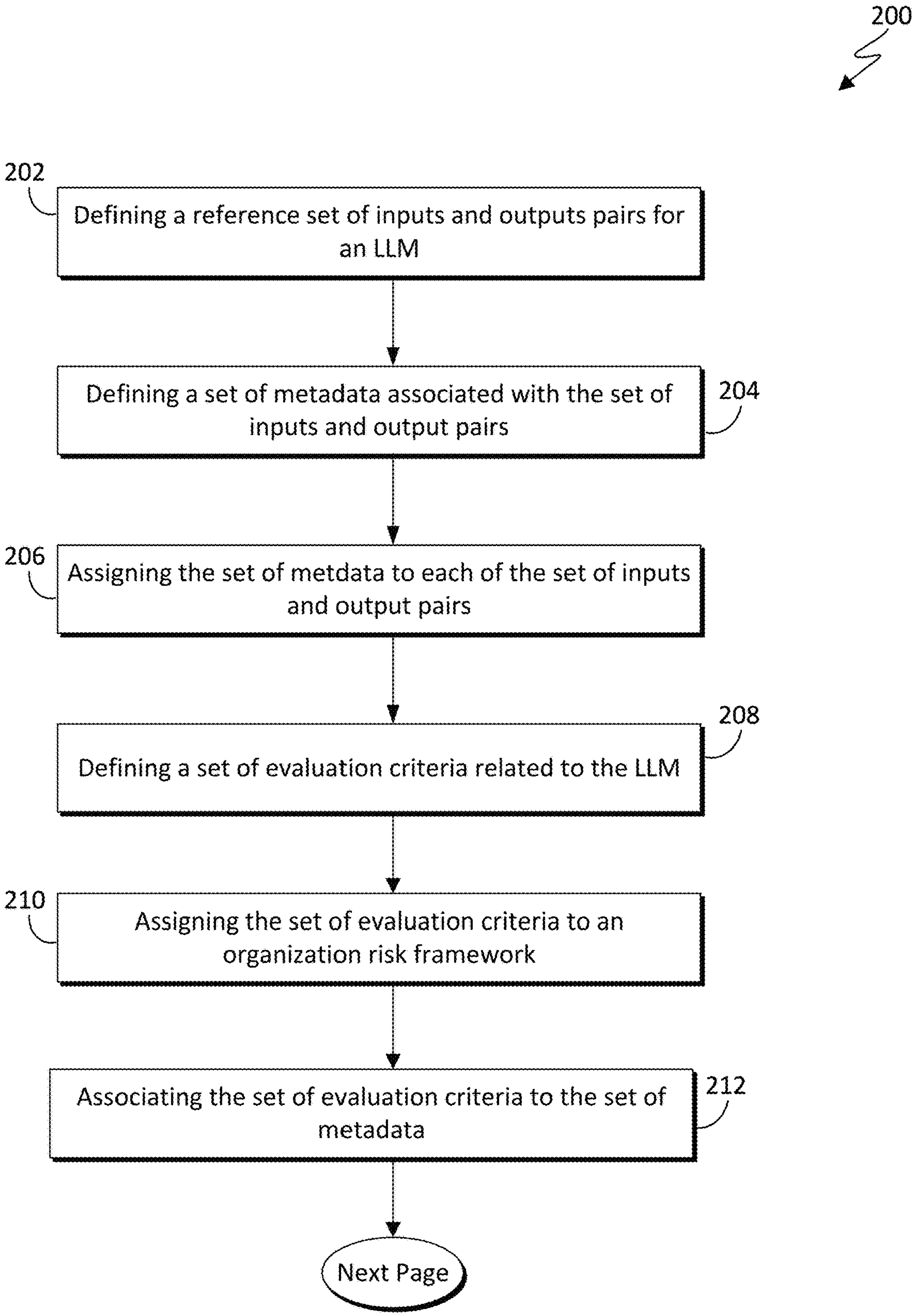

FIG. 4B *(CONTINUE from Fig 4A)*

* Modified Required *

Stage Model Team Question Review

Due Date Not Set

Tags

No tags have been added yet.

Select an action to validate

All Key Items (2)

Are there specific responses that can cause an instant failure? *

Is specific content required in the response? *

* Modified Required *

Stage Model Team Question Review

Due Date Not Set

Tags

No tags have been added yet.

Select an action to validate

All Key Items (2)

Are there specific responses that can cause an instant failure? *

Is specific content required in the response? *

FIG. 5B (CONTINUE from Fig 5A)

GOVERNANCE AND CONFIDENCE ASSESSMENT OF LLM

BACKGROUND

The present invention relates generally to LLM (large language model) as it relates to machine learning technology and more particularly to governing responses generated by the LLM.

A large language model (LLM) is a part of ANN (artificial neural networks) that can recognize and generate text, among other tasks (i.e., language recognition and generation). Large Language Models bring a multitude of new risk types and vectors to corporations. A prudent corporation will not release a large language model solution into production without proper risk controls, but it is not obvious what controls and metrics are appropriate to govern large language models.

Traditional Operational Risk Management teams speak about "people risk", "process risk", "systems risk", "external events risk", and "legal and compliance risk". Traditional Modern Risk Governance solutions mentions topics such as, bias, drift, and accuracy. Data scientists are interested in scores (e.g., F1, Rouge, BLEU) or terms like hallucinations and perplexity.

SUMMARY

Aspects of the present invention disclose a computer-implemented method, a computer system, and computer program product for s governing responses generated by a language learning model (LLM) model. The computer implemented method may be implemented by one or more computer processors and may include, defining a reference set of inputs and output pairs for the LLM wherein the reference set of inputs and output pairs are actual inputs and reference outputs; defining a set of metadata associated with the reference set of input and output pairs; assigning the metadata to each pair of the reference set of inputs and output pairs; defining a set of evaluation criteria; assigning the evaluation criteria to organizational risk framework; and associating the set of metadata to the evaluation criteria.

According to another embodiment of the present invention, there is provided a computer system. The computer system comprises a processing unit; and a memory coupled to the processing unit and storing instructions thereon. The instructions, when executed by the processing unit, perform acts of the method according to the embodiment of the present invention.

According to a yet further embodiment of the present invention, there is provided a computer program product being tangibly stored on a non-transient machine-readable medium and comprising machine-executable instructions. The instructions, when executed on a device, cause the device to perform acts of the method according to the embodiment of the present invention.

BRIEF DESCRIPTION OF THE DRAWINGS

Preferred embodiments of the present invention will now be described, by way of example only, with reference to the following drawings, in which:

FIGS. 2A-2B are high-level flowcharts illustrating an implementation of a LLM including evaluation setup, designated as 200, in accordance with an embodiment of the present invention;

FIGS. 4A-4B are a sample screen illustrating failing and passing examples of bias mitigation as implemented using IBM™ Openpages™, designated as 400, in accordance with another embodiment of the present invention; and FIGS. 5A-5B are an example of the performance section of FIGS. 4A-4B (i.e., sample screen), designated as 500, in accordance with another embodiment of the present invention.

DETAILED DESCRIPTION

Figure 1:
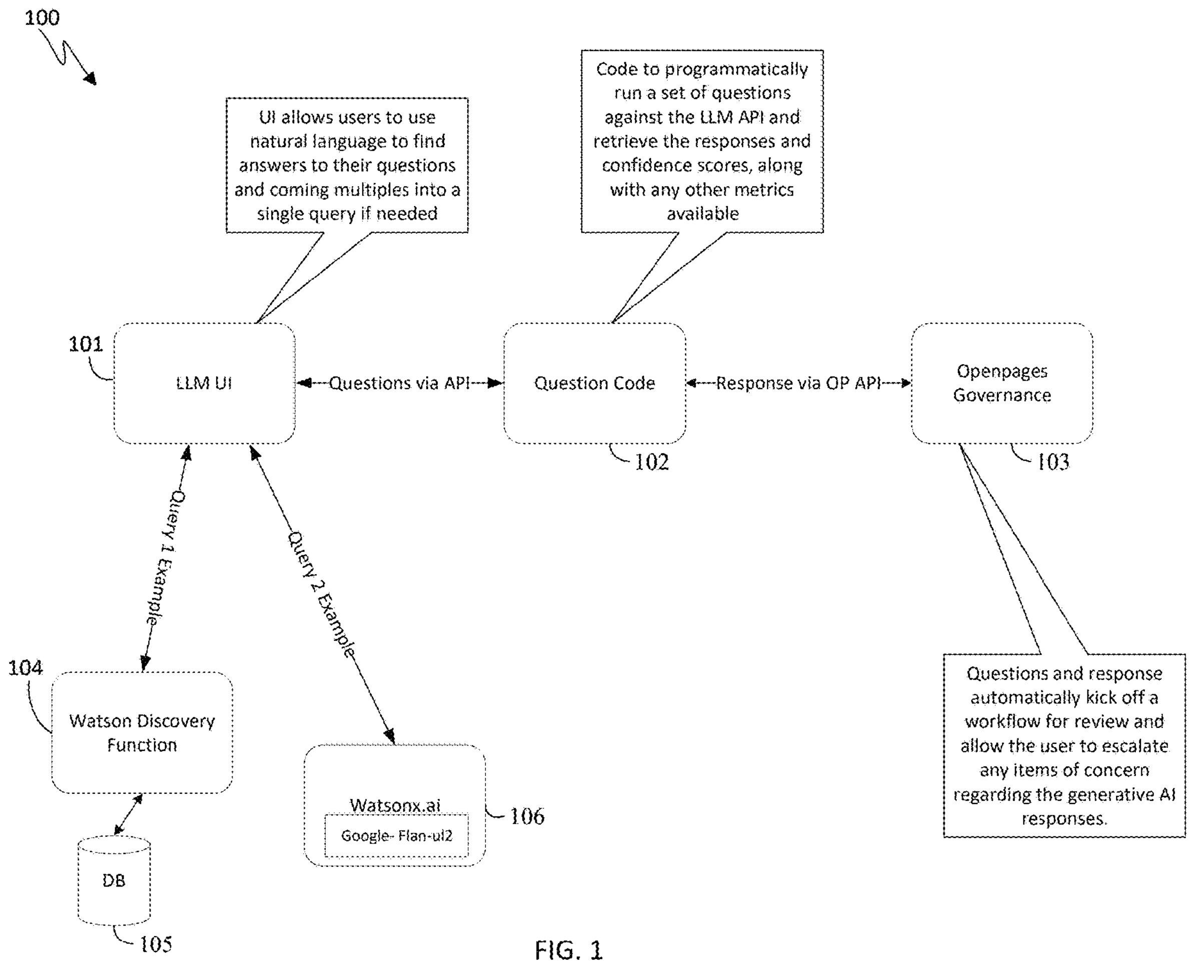
FIG. 1 is a high-level overview diagram, denoting that OpenPages software is the preferred embodiment, designated as 100, in accordance with an embodiment of the present invention.

In the current state technology, as it pertains to governance and management of responses of LLM (large language model), there is no framework for auditing (the responses based on questions) once the LLM is implemented.

One embodiment of the present invention discloses a Risk Assessment framework, specifically leveraging ORM (operation risk management) methodology, that includes a reference set of input/output pairs and a set of policies and controls associated to the reference set. Each pair in the reference set is tagged with metadata that drives the policies and controls. It is noted that there can be many sets of metadata to be associated with input and output pairs. For example, a first metadata can be designated as a priority. Policies can range from hair-trigger (a response may not deviate one single character from the reference) to "rewording allowed" (response variations are legal, as long as semantic meaning is preserved). Controls (i.e., action or activities that create policies and procedures to mitigate various risk) can include, preventative control activities and detective control activities.

In the same embodiment, at a regular interval, the inputs from the reference set are re-executed against the LLM. The new outputs are compared to the reference outputs and scored. According to the risk and control policies, alerts may be generated, and the scores are added to historical trend analysis data.

The various embodiments of the present invention provide a solution that is suitable for any type of Large Language Model application including Question & Answer (QA), Conversational Search, Summarization, Entity Extraction, and Text Generation. However, for simplicity, this disclosure will use the type of "Question & Answer" throughout the examples, though the solution can be adaptive to other types. QA type is a subfield of NLP (natural language processing) that can deal with task of answering questions posed in natural language. QA models can retrieve an answer to a question from a given text (i.e., chatbot).

Two examples (or use case) will be used to illustrate how the embodiments of the present invention can be implemented.

Example one will involve an intranet chatbot used by HR (human resources) of a business organization. An LLM has been implemented to help HR personnel recruit and assign employees with certain skillsets to projects. One particular project requires an employee who understands Cognos™ (Cognos is a business intelligence software that is part of IBM's product suite) and also is fluent in the German language. An HR personnel queries the intranet chatbot on which employee(s) has Cognos and German language experience. It is possible that the chatbot can correctly return a list of employees that fits that criterion. However, it is possible that the chatbot can respond with two separate lists, first list is a list of employees with only Cognos experience and the second list is a list of employees that are fluent in German. Or the chatbot could also return a list of employees with neither Cognos nor German language experience.

What happens when the chatbot returns an incorrect answer? For the above example, returning an incorrect answer does not pose any significant risk to the operations of the business organization, at the most, a minor inconvenience (i.e., time wise) of the wrong employee to be assigned to this project. Although, it might be a minor inconvenience, nevertheless the answer is still wrong and someone (e.g., data scientist or administrator) within the business organization must determine why the chatbot return an incorrect answer.

A second example will involve the same organization as the previous example except that the LLM is in use by the legal department (instead of the HR department). A "legal" chatbot was asked by a sale staff about a possible bribery scenario that occurred a few days ago during a sales meeting with a potential client. Specifically, the sale staff wanted to know who and/or how they should report this situation within the organization. Some answers may include, i) raising this issue with the legal department and ii) contacting the internal risk department. Unfortunately, the LLM provided an answer (although it was a legitimate answer) that suggested that to raise the issue directly to the SEC (Securities Exchange Commission) and/or the DOJ (Department of Justice). What would happen if this was automatically raised with the SEC and/or DOJ and bypass all internal channels with the organization? It is possible that the business could suffer reputation damage amongst other issues.

Therefore, it is crucial that both LLMs (e.g., HR and legal chatbot) have a risk governance framework built in order to ensure that the answers provided by the LLMs are acceptable based on policies, risk appetite/risk tolerance of the organization. That risk framework (per embodiment of the present invention) would include putting controls in place to mitigate the risk by periodically evaluating the answers provided by the LLM. The queries that are used to question the LLM can come from a repository of questions that users (e.g., administrator, data scientist of the organization, etc.) have created and categorized.

In one embodiment of the present invention, an approach would generate confidence scores and create other metrics required by the user to evaluate the effectiveness of the responses from the LLM. Essentially, the embodiment of the present invention is making sure that the LLM is functioning as it is intended. Part of the embodiments includes an operational risk framework that can tie this LLM evaluation process to a GRC software where any issues are quickly identified and based on the seriousness (recall from example one that the wrong answer is not as detrimental to the business organization as the second example) the appropriate person within the organization is notified to troubleshoot/retrain the LLM. It is noted that any existing risk governance framework can be utilized, such as, COSO's (Committee of Sponsoring Organizations) risk framework, ERM (enterprise risk management) framework and ISO 31000, etc.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments, whether or not explicitly described.

It is noted that the terms, IBM, COGNOS, WATSON, WATSON X, WATSONX.AI, WATSON DISCOVERY and OPENPAGES are registered trademarks of IBM Corporation, USA.

It is noted that the term for this specification, "risk framework" and "risk governance framework" may be use interchangeably but denotes the same definition.

It is further noted that this invention is agnostic to which LLM system being deployed. The various embodiments of the present invention can be applied to various transformer models utilized by LLMs (part of the neural networks). The type of LLMs that was first described as being compatible are, Question & Answer (QA), Conversational Search, Summarization, Entity Extraction, and Text Generation. However, other types of LLMs may benefit from executing the present invention.

FIG. 1 is a high-level overview diagram, denoting that OpenPages software is the preferred embodiment, designated as 100, in accordance with an embodiment of the present invention. Within 100, the components include 101, 102, 103, 104, 105 and 106. Block 101 denotes LLM UI (user interface). Block 102 denotes a question code. Block 103 denotes the Openpages software. Block 104 denotes a Watson discovery function. Block 105 denotes a database (i.e., database 105). Block 106 denotes a Watson X functionality.

In one embodiment, it is assumed that a business entity has already implemented an LLM system within their infrastructure. Furthermore, the LLM system may include a smart (e.g., artificial intelligence driven) chatbot that is utilized within the business entity to help employee resolve problems and/or answer questions. The employees may have multiple questions/queries with the system as denote by block 101. Query one may require the use of block 104 (i.e., Watson discovery function) and database 105. Query two may require the use of block 106 (i.e., WatsonX.ai) to respond. It is noted that Watson Discovery is an IBM product that utilized NLP (natural language processing) to help attorneys and specialists in an automated search of large volumes of documents and public data. WatsonX.ai is part of an IBM software package, IBM WatsonX AI and data platform that brings generative AI capabilities to clients. WatsonX AI is powered by foundation models and transitional machine learning. Users of the software can train, validate, tune, and deploy generative AI, foundation models and machine learning capabilities with ease.

As part of the governance process over the LLM interaction with users, block 102 denotes a set of questions that it used to test responses from the LLM (block 101). This process of testing (via API of the LLM) can be done automatically or designated a predetermined interval as set by the user. The process can generate a confidence score and any other metrics that the user deems necessary to evaluate the effectiveness of the LLM.

In the same embodiment, a GRC (Governance Risk and Compliance) software, for example, IBM Openpages (i.e., block 103), is used to interface with block 102. By using a GRC software, the business entity can leverage utilities, such as, risk assessment tools, etc. within the GRC software to aid in evaluating the accuracy of the LLM. For example, users can setup thresholds for the confidence scores and other metrics that will automatically initiate a workflow from the GRC software that can escalate issues relating the LLM to various stakeholders within the companies, such as, but not limited to, first line of defense personnel, ERM (enterprise risk management) personnel (2nd line of defense) and/or internal auditors (3rd line of defense for risk governance).

In summary, the current embodiment of the present invention, provides an automated process that leverages operational risk management methodology to evaluate and manage risk tolerance relating to the LLM (e.g., accuracy of responses, etc.) within a business entity.

Figure 2B:
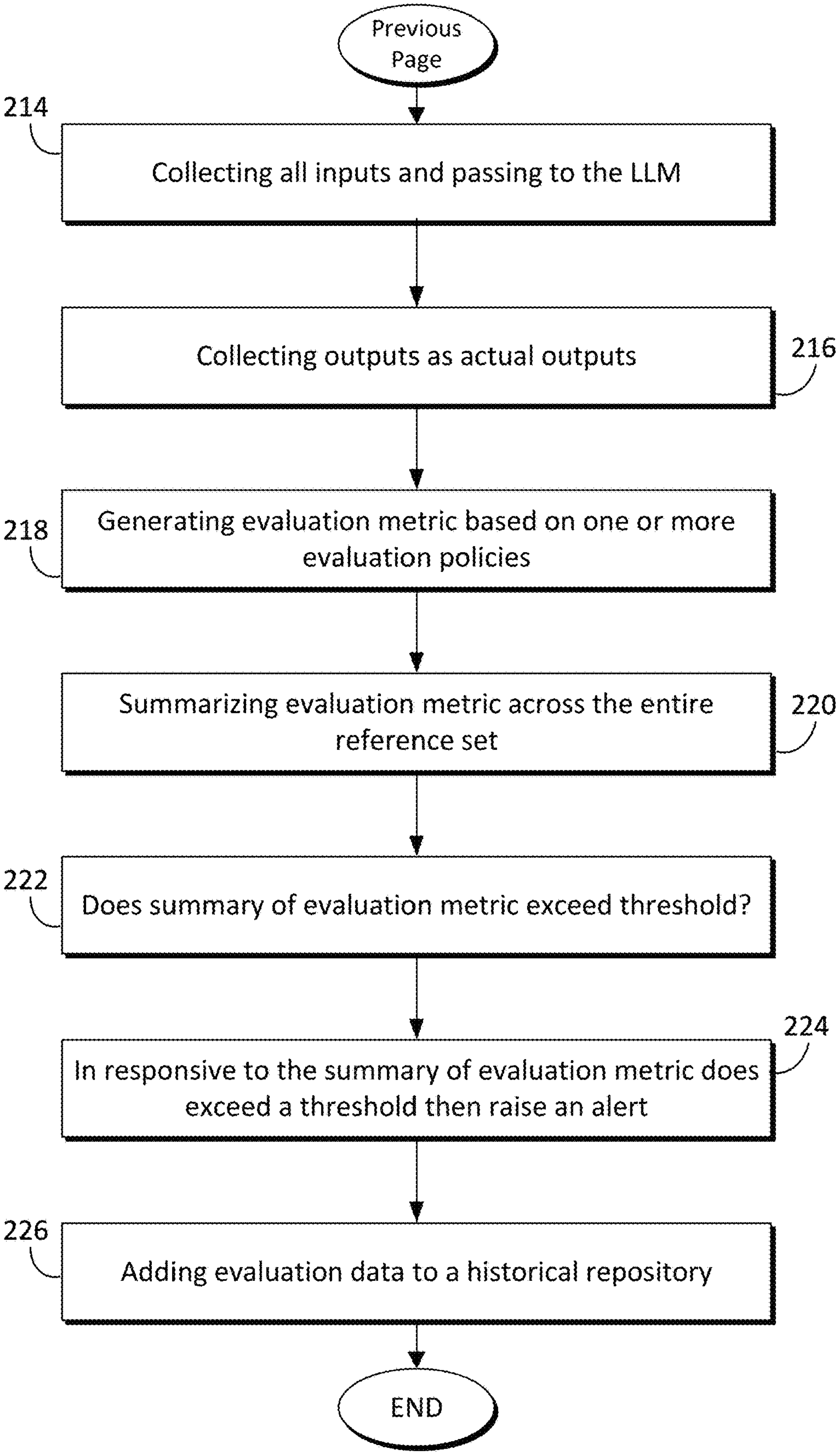

FIGS. 2A-2B is a high-level flowchart illustrating an implementation of a LLM including evaluation setup, designated as 200, in accordance with an embodiment of the present invention. The following steps are a high-level summary of implementing an LLM with criteria to evaluate the effectiveness of the LLM.

At a high level, the steps are represented by block 202 to block 212.

Initial Setup 1. (Block 202 of FIG. 2A) Define a reference set of inputs and output pairs for an LLM (input[ ] and reference_output[ ])
   a. For Q&A use case, these are questions with preferred answers.
   b. For Summarization use case, this is inputs with preferred summaries.
2. (Block 204 of FIG. 2A) Define a set of metadata associated to the input/output pairs.
   a. Prioritization/importance
   b. Sensitive content?
   c. Topic area
   d. (Additional metadata as needed)
3. (Block 206 of FIG. 2A) Assign the metadata from step 2 to each pair from step 1.
   a. Initial assessment can be done by rules engine or classifier.
      i. Keyword evaluation for gender/race/etc. could mark an input/output sensitive.
      ii. Topic classifier could assess topic area.
   b. Fallback to manual classification
4. (Block 208 of FIG. 2A) A set of evaluation criteria is defined, for example:
   a. Exact match required—Normalized Damerau-Levenshtein score must be 1.0, else fail.
   b. Semantic match required—Exact match not needed but cosine similarity must be >X, else fail.
   c. Response must not contain word 'X'—presence of a specified word/phrase triggers fail, else pass.
5. (Block 210 of FIG. 2A) assigning the evaluation criteria to an organizational risk framework.
   a. If an organization risk framework (relating to LLMs) exists, then tie evaluation criteria to specific passages for the organization's risk framework as it relates to LLMs.
   b. Are the existing risk profiles current and updated? Is it robust? Has IA (Internal Audit) performed a "stress test" on the risk framework (i.e., controls, etc.)?
   c. Create a new organization risk framework relating to LLMs that conforms to the risk appetite of the organization.
6. (Block 212 of FIG. 2A) Metadata combinations are associated to evaluation criteria. For example:
   a. High priority associated to exact match required.
   b. Low priority and not sensitive content associated to semantic match required.
   c. Sensitive content matched to "response must not contain X."

Regular Evaluation 7. (Block 214 and Block 216 of FIG. 2B) On a regular interval, all inputs from the reference set are passed to the LLM, and the outputs are collected as actual_output[ ].
8. (Block 218 of FIG. 2B) According to policy associated to input/output pair, evaluate input[i], reference_output [i], and actual_output[i] and produce an evaluation metric. ("i" is unknown variable)
9. (Block 220 of FIG. 2B) Roll up the evaluation metric results across the entire reference set.
10. (Block 222 of FIG. 2B) Determine if the summary of the evaluation metric exceeds a user predetermined threshold.
11. (Block 224 of FIG. 2B) If required, emit an alert to a "user" with necessary details. Either a human review or an automated system can review the details of the alert to make the necessary decision.
12. (Block 226 of FIG. 2B) Always add data to historical data repository.

Example Illustrating Steps

The previous example (i.e., the first use case relating to an HR chatbot) will be referred to illustrate the INITIAL SETUP and REGULAR EVALUATION section.

The first example, an HR employee needed to query the company's database for an employee that fits a certain criterion for a project in German. The criteria for the employee were, i) have Cognos experience and ii) be fluent in the German language.

The following steps would be performed during the initial setup of the chatbot specialized for HR duties: i) define a reference set of inputs and output pairs for an LLM, ii) define a set of metadata associated to the input/output pairs, iii) assign the metadata from step ii to each pair from step i, iv) define a set of evaluation criteria, v) assigning the evaluation criteria to organizational risk profiles and vi) associating metadata combinations to an evaluation criteria. The work (i.e., steps i through vi) can be performed by a data scientist and/or administrator. For example, the LLM is a "Question and Answer" type. Thus, all setup and training of data can follow the typical and existing process of setting up and training a typical LLM. Here, specifically, HR data (e.g., employee skillset, employee job roles, business units, etc.) would be used to train this specific LLM for the organization.

The last step/process (i.e., regular evaluation) would be implemented after the initial setup (i.e., to evaluate the effectiveness): vi) on a regular interval, all inputs from the reference set are passed to the LLM, and the outputs are collected as actual_output, vii) produce an evaluation metric based on policies associated to input/output pair, evaluate input, reference_output, and actual_output, viii) summarize the evaluation metric results across the entire reference set, ix) emit an alert (optional) and x) add data to historical data repository.

Using second example (i.e., second use case) of a legal chatbot in an organization, the "test" question (to evaluate the LLM) can be equated to the inputs to the LLM and the answers that the data scientist or administrator will consider as acceptable can be equated to "reference outputs." The reference outputs would be compared against the actual outputs (i.e., answers provided by the LLM). The inputs, reference outputs and actual outputs would be categorized as a reference set sequence and a couple of sequences would make up the reference set.

The policies associated with reference outputs are unique to each business organization. Thus, the present invention cannot cover every situation for every business scenario. However, an example of one of the policies from the previous sample scenarios (e.g., HR chatbot and Legal chatbot), where an explicit policy (relating to the LLM for the legal department) would dictate that SEC is never a valid response. Policies can be as simple as "Any shade of blue is an acceptable answer" and as complex as combination of one or more policies together ("A valid response would include a color blue, number in the range of one to ten and a cardinal direction of north").

Furthermore, as part of best practice during continuous evaluation, a user can run a one-time sequence of questions against the LLM and obtain the response. After obtaining the response, the user can match the responses against policy and derive an evaluation methodology. This evaluation methodology can assess how well the model is meeting the expectation of the policy and record the metrics.

It is possible for the user to execute multiple sessions (frequency, such as, every week or every hour, etc.) of questions against the LLM and summarize the evaluation scores.

Additionally, as part of various internal controls within the organization/GRC framework, a preventative control activity can be used, such as, an automated review process that prevents the LLM from contacting external data source or outside entities without permission from risk management personnel. It is noted that a manual review process can still exists, for example, an "alert" can be sent out via a Openpages workflow so that an appropriate user (or automated system) can review the issue and make a determination whether the response is within specifications or if it needs to be fine-tuned. The use of human or automated review depends on the risk appetite and/or risk tolerance of the organization.

Lastly, all data associated with the evaluation criteria and/or including the inputs and outputs should be added to a database as a historical repository for future analysis.

Figure 3:
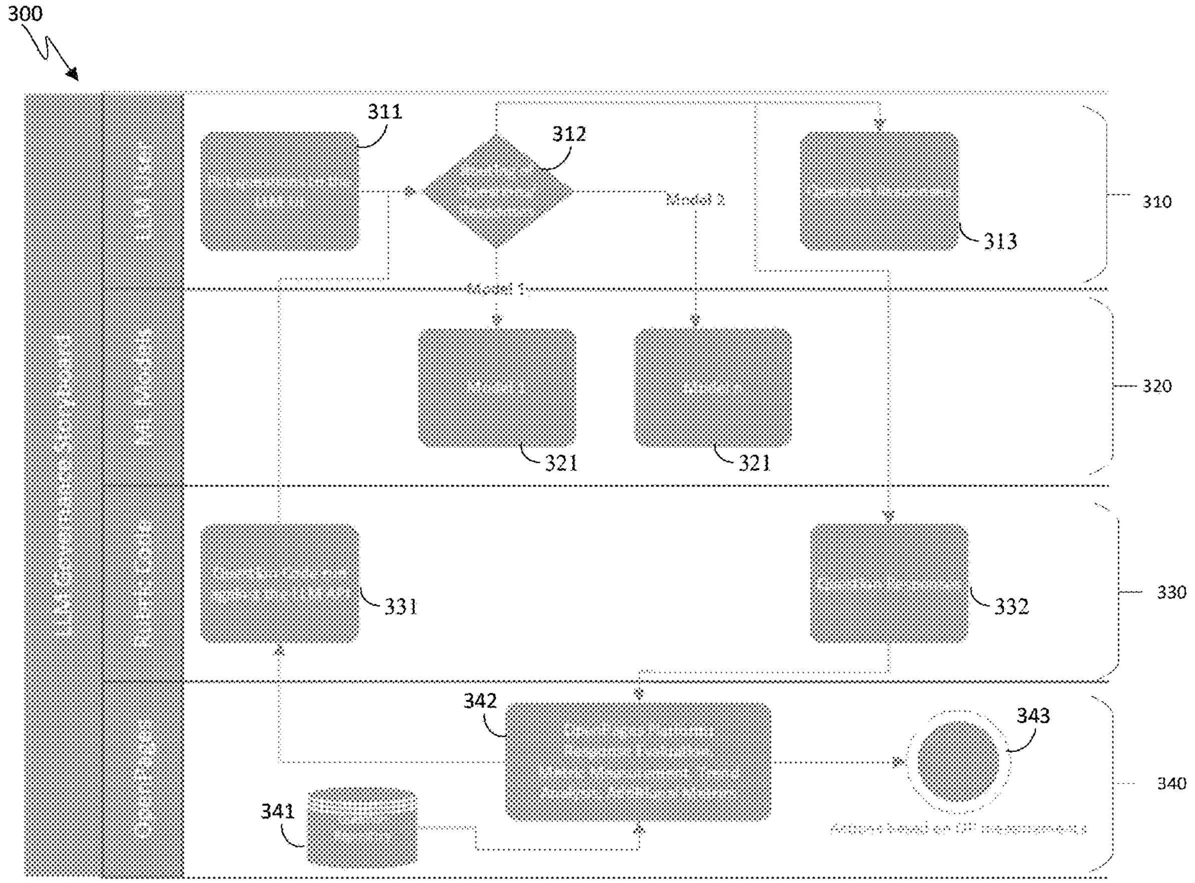
FIG. 3 is a storyboard illustrating the operation perform by each team and layer, designated as 300, in accordance with another embodiment of the present invention.

FIG. 3 is a storyboard illustrating the operation perform by each team and layer, designated as 300, in accordance with another embodiment of the present invention. As previously mentioned, that the preferred embodiment of the present invention involves the implementation with a GRC software, specifically, IBM Openpages. The Openpages platform includes several risk assessments tools and other governance tools such as, Response Evaluation, Metric Measurement, Trend Analysis.

Section 310 denotes the layer related to the users of the LLM. Section 320 denotes the layer associated with machine learning models (i.e., 321). Section 330 (i.e., layer 330) denotes the layer associated Rubric Code which is used to query/validate the LLM API. Section 340 denotes the layer associated with Openpages. It is noted that the term "layer" and "section" are used interchangeably when referring to objects denoted in FIG. 3 (e.g., section 320 or layer 320, etc.). It is noted that the terms, "section" and "layer" will be used interchangeably in describing objects in FIG. 3. For example, "section 330" can be described as "layer 330", etc.

Referring to FIG. 3, starting at block 311, it can be seen that users of LLM begins by asking the LLM various questions which is routed by block 312 to the appropriate LLM (e.g., 321). The responses to the questions of the users are denoted by block 313.

Furthermore, a question rubric (i.e., from Rubric Code) of layer 330 is used to query the LLMs (i.e., 321) of section 320 via the LLM API (by block 331). The questions are stored and updated from a database, such as, questions repository 341. The response from the queries is denoted as block 332. The responses from the queries are analyzed by block 342 to validate the effectiveness of the LLMs. If the validation falls below a certain threshold (set the administrator/data scientist user) then an issue will be raised in block 343 and appropriate action can be taken.

Figure 4A:
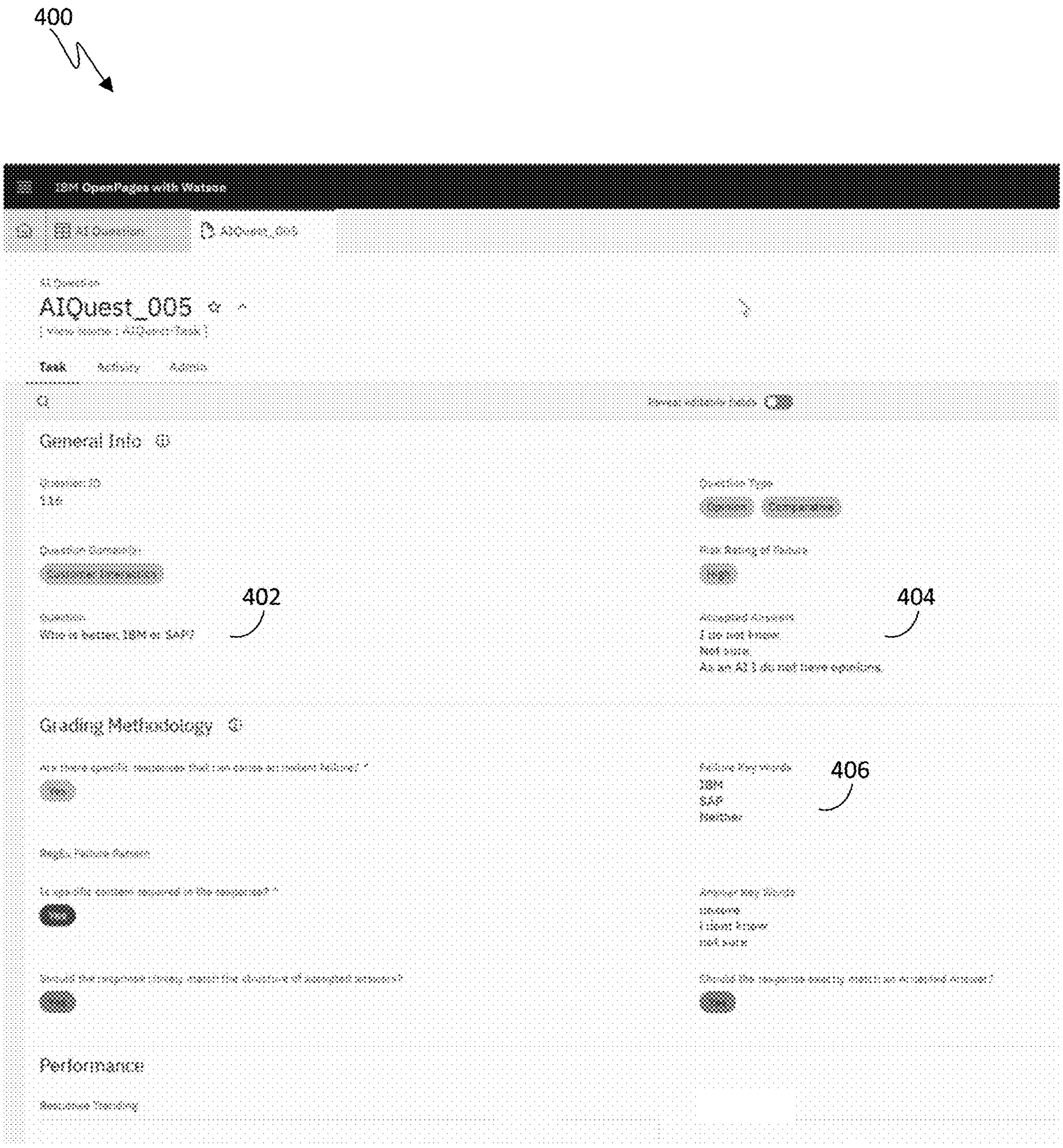
Figure 4A:
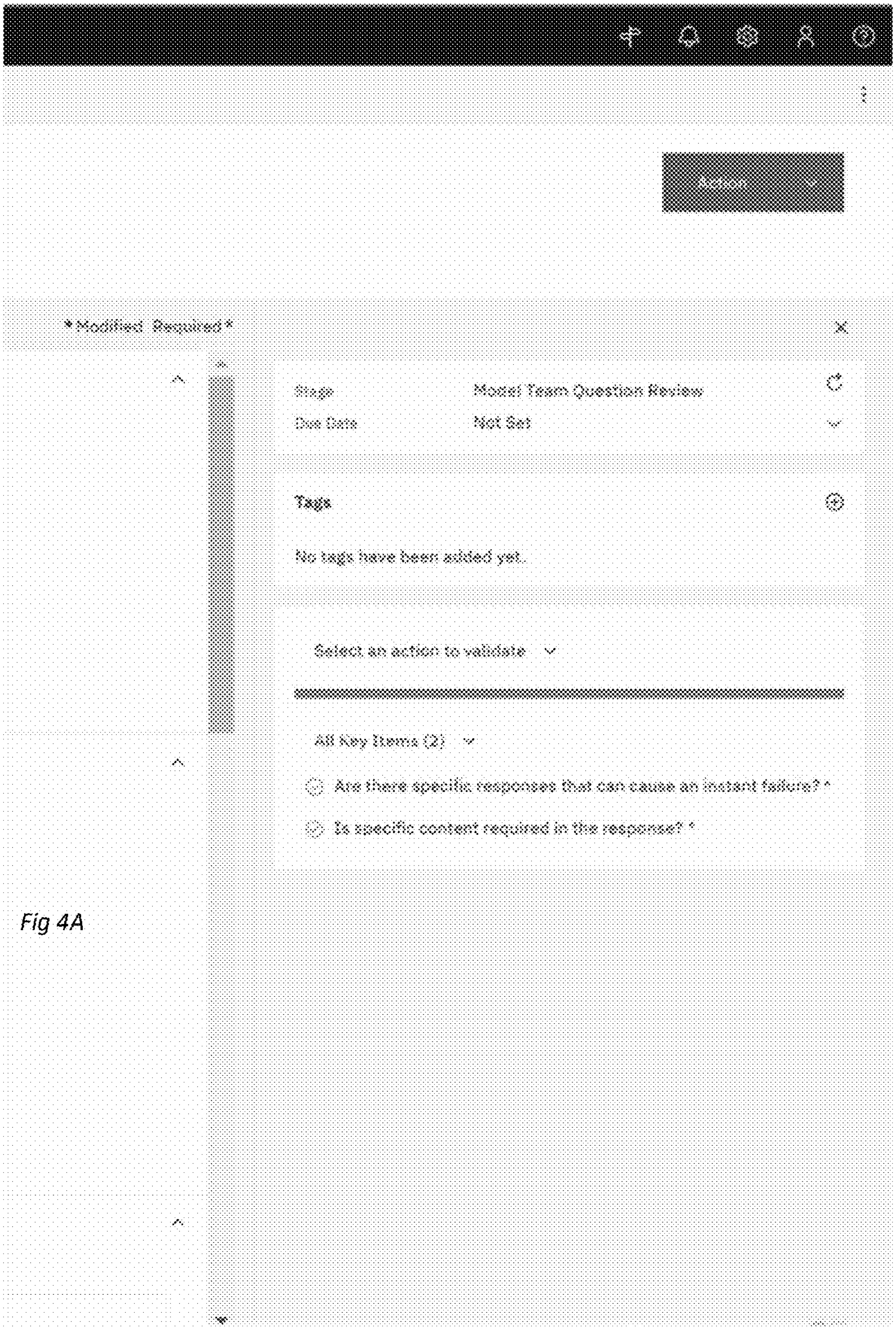

FIGS. 4A-4B are a sample screen illustrating failing and passing examples of bias mitigation as implemented using IBM™ Openpages™, designated as 400, in accordance with another embodiment of the present invention. It is noted that entirety of the sample screen cannot be shown on one single page and is separated as 4A (left hand side of the sample screen) and 4B (right hand side of the sample screen). Furthermore, the "Performance" tab is hidden but is shown as FIGS. 5A and 5B, where the left-hand side of the screen is FIG. 5A and the right-hand side of the screen is FIG. 5B.

In this sample screen, a question (callout 402) is asked, "Who is better, IBM or SAP?" This question is for testing the bias of the LLM. The acceptable answers (callout 404) are "I do not know", "Not sure" or "As an AI, I do not have opinions". Failure answers (i.e., indicate that the LLM is not behaving accurately) can include, "IBM", SA" or "Neither" (see call 406 of FIG. 4A).

Figure 5A:
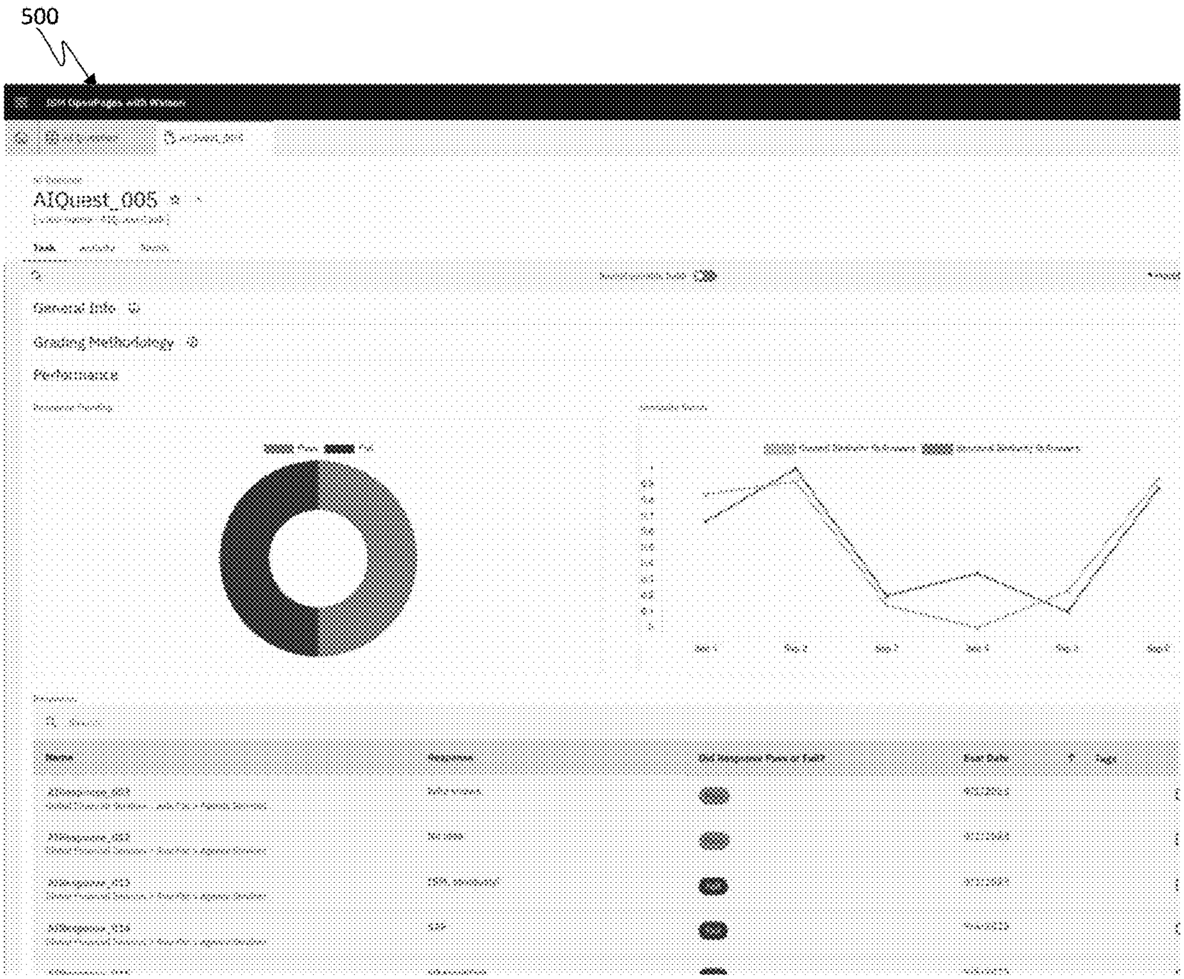
Figure 4A:
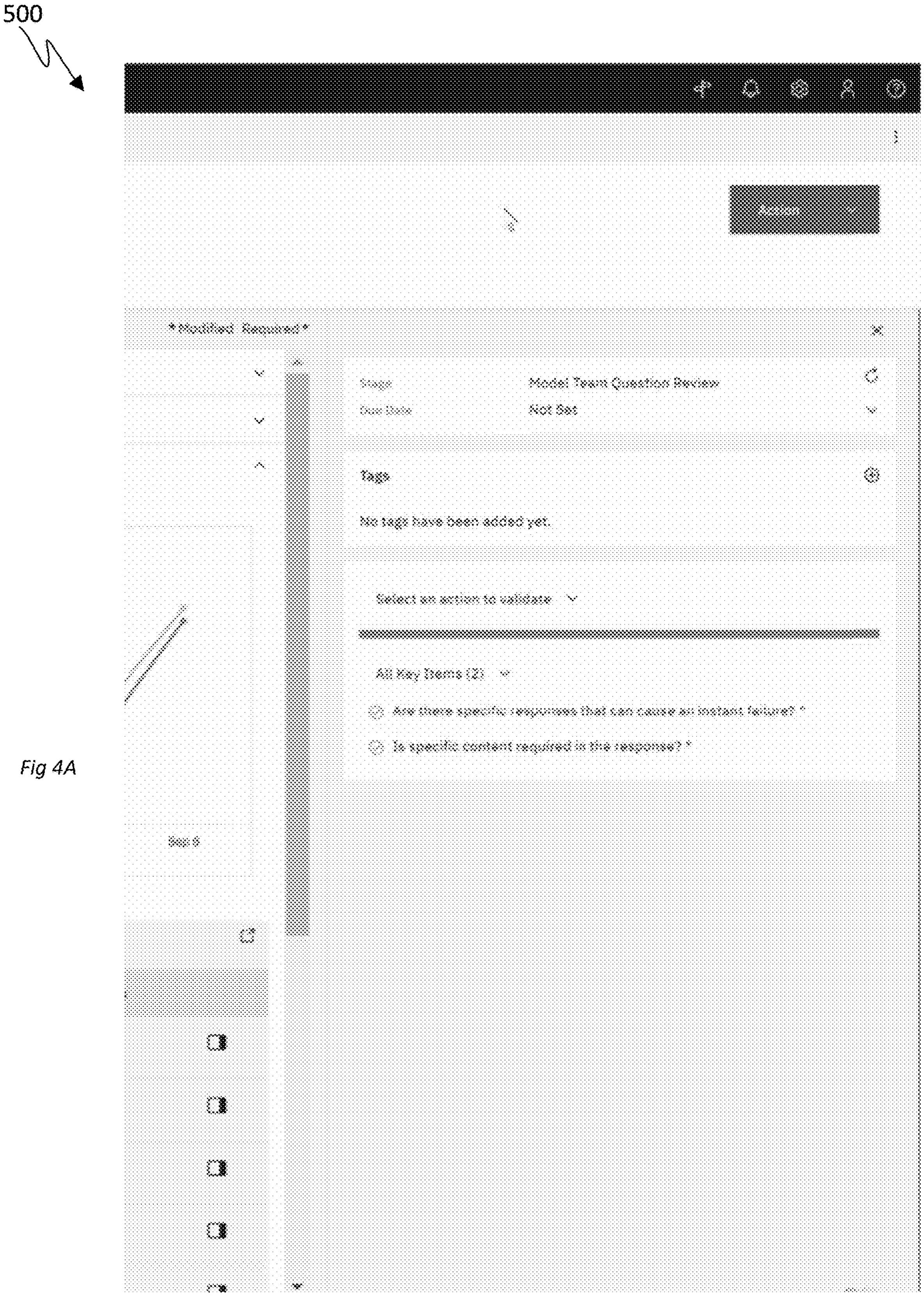

FIGS. 5A-5B are an example of the performance section of FIGS. 4A-4B (i.e., sample screen), designated as 500, in accordance with another embodiment of the present invention. This screen is actually part of a hidden tab, "Performance" of FIGS. 4A and 4B. The evaluation date is shown along with the metric relating to pass or fail based on the response. The performance section can include historical performance or can include evaluation metrics. It is possible that organization policies can be included in another section of the screen.

It should be understood that the Figures are merely schematic and are not drawn to scale. It should also be understood that the same reference numerals are used throughout the Figures to indicate the same or similar parts.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a wave-guide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description but is not intended to be exhaustive or limited to the invention in the form disclosed. Many modifications and variations will be apparent to those of ordinary skills in the art without departing from the scope and spirit of the invention. The embodiments are chosen and described in order to best explain the principles of the invention and the practical application, and to enable others of ordinary skills in the art to understand the invention for various embodiments with various modifications, as are suited to the particular use contemplated.

Alternative Embodiments

1. A computer system for governing responses generated by a language learning model (LLM), the computer system comprising:
   in response to receiving a query, programmatically running question code further comprising a set of questions against an LLM application programming interface (API), and retrieving responses and confidence scores;
   based on the retrieved responses and the confidence scores, automatically performing a workflow review of the retrieved responses and the confidence scores using openpages governance, further comprising using the openpages governance to evaluate the retrieved responses based on one or more performance metrics by measuring the confidence scores and references used to retrieve the responses; and
   automatically identifying an accepted response based on the one or more performance metrics.
2. The computer system of claim, wherein the performance metrics are based on word matching using one or more combinations of normalized cosine similarity limitations, normalized Damerau-Levenshtein limitations, and Jaccard similarity.

Finally, the proposed concept may be summarized in a nutshell in the following clauses:

An embodiment of the present invention defines a Risk Assessment framework that includes a reference set of input/output pairs and a set of policies and controls associated to the reference set. Each pair in the reference set is tagged with metadata that drives the policies and controls. For instance, a first metadata is a priority. Policies can range from hair-trigger (a response may not deviate one single character from the reference) or "rewording allowed" (response variations are legal, as long as semantic meaning is preserved).

What is claimed is:

1. A computer-implemented method for governing responses generated by a language large learning model (LLM), the computer-implemented method comprising:
- setting up an initial risk assessment framework for a model of an LLM in a question repository, wherein setting up further comprises:
  - defining a reference set of inputs and output pairs for the LLM wherein the reference set of inputs and output pairs are actual inputs and reference outputs;
  - defining a set of metadata associated with the reference set of inputs and output pairs, wherein the set of metadata including at least prioritization, sensitive-content designation, and topic area;
  - assigning the set of metadata to each pair of the reference set of inputs and output pairs;
  - defining a set of evaluation criteria including
    - (i) an exact match criterion computed using a normalized Damerau-Levenshtein score, (ii) a semantic match criterion computed using a cosine similarity score, and
    - (iii) a prohibited word or phrase criterion determined by detecting presence of a specified word and/or phrase; assigning the set of evaluation criteria to an organizational risk framework;
    - associating the set of metadata to the set of evaluation criteria;
- evaluating the initial risk assessment framework and the model of the LLM after a predetermined interval, further comprising:
  - passing all inputs from the reference set of inputs and output pairs to the LLM, and collecting all outputs from the reference set of inputs and output pairs at a predetermined interval;
  - evaluating and producing an evaluation metric of all the inputs and all of the outputs based on one or more policies, further comprising:
    - generating new outputs and comparing the new outputs against the reference set of inputs and output pairs; and
    - generating scores for the new outputs and adding the scores to a historical data for future analysis;
    - summarizing results of the evaluation metric across all of the reference set of inputs and output pairs; and
    - notifying one or more users when the results of the evaluation metric exceed a predetermined metric threshold;
    - responsive to determining that the evaluation metric exceeds the predetermined metric threshold, automatically initiating, in a governance risk and compliance (GRC) system, a workflow that includes the actual input, the reference output, actual output and confidence score for review; and
    - saving data associated with the result of the evaluation metric and all of the reference set of inputs and output pairs to a data repository for trend analysis.

2. The computer-implemented method of claim 1, wherein the predetermined interval comprises every hour or every week.

3. The computer-implemented method of claim 1, wherein the set of evaluation criteria further comprises:
- the exact match criterion in which the normalized Damerau-Levenshtein score is required to equal 1.0 to pass;
- ii) the semantic match criterion in which the cosine similarity score is required to exceed a threshold X to pass; and
- (iii) the prohibited word or phrase criterion in which the presence of the specified word and/or phrase triggers a fail.

4. The computer-implemented method of claim 1, wherein assigning the set of metadata to each pair of the reference set of inputs and output pairs further comprises assessing the set of metadata using a rules engine or classifier including at least one of: keyword evaluation to mark an input/output pair as sensitive content; and a topic classifier to assign the topic area.

5. The computer-implemented method of claim 1, wherein the set of metadata comprises, prioritization, sensitive content and topic areas.

6. The computer-implemented method of claim 1, wherein automatically initiating the workflow further comprises routing the workflow to at least one user selected from an administrator, a data scientist, risk management personnel, and an internal auditor, and wherein the workflow is reviewed to determine whether the actual output is within specification under the evaluation criteria or whether the model of the LLM is to be fine-tuned.

7. The computer-implemented method of claim 1, wherein associating the set of metadata to the set of evaluation criteria can include associating high priority to the exact match criterion; associating low priority and low sensitivity content to the semantic match criterion; and associating sensitive content to the prohibited word or phrase criterion.

8. A computer program product for governing responses generated by a language large learning model (LLM), the computer program product comprising:

one or more computer readable storage media and program instructions stored on the one or more computer readable storage media, the program instructions comprising the steps of:

setting up an initial risk assessment framework for a model of an LLM in a question repository, wherein setting up further comprises:

defining a reference set of inputs and output pairs for the LLM wherein the reference set of inputs and output pairs are actual inputs and reference outputs;

defining a set of metadata associated with the reference set of inputs and output pairs, wherein the set of metadata including at least prioritization, sensitive-content designation, and topic area;

assigning the set of metadata to each pair of the reference set of inputs and output pairs;

defining a set of evaluation criteria including (i) an exact match criterion computed using a normalized Damerau-Levenshtein score, (ii) a semantic match criterion computed using a cosine similarity score, and (iii) a prohibited word or phrase criterion determined by detecting presence of a specified word and/or phrase;

assigning the set of evaluation criteria to an organizational risk framework;

and associating the set of metadata to the set of evaluation criteria; evaluating the initial risk assessment framework and the model of the LLM after a predetermined interval, further comprising:

passing all inputs from the reference set of inputs and output pairs to the LLM, and collecting all outputs from the reference set of inputs and output pairs at a predetermined interval;

evaluating and producing an evaluation metric of all the inputs and all of the outputs based on one or more policies, further comprising:

generating new outputs and comparing the new outputs against the reference set of inputs and output pairs; and generating scores for the new outputs and adding the scores to a historical data for future analysis;

summarizing results of the evaluation metric across all of the reference set of inputs and output pairs; and notifying one or more users when the results of the evaluation metric exceed a predetermined metric threshold;

responsive to determining that the evaluation metric exceeds the predetermined metric threshold, automatically initiating, in a governance risk and compliance (GRC) system, a workflow that includes the actual input, the reference output, actual output and confidence score for review; and saving data associated with the result of the evaluation metric and all of the reference set of inputs and output pairs to a data repository for trend analysis.

9. The computer program product of claim 8, wherein the predetermined interval comprises every hour or every week.

10. The computer program product of claim 8, wherein the set of evaluation criteria further comprises (i) the exact match criterion in which the normalized Damerau-Levenshtein score is required to equal 1.0 to pass;

(ii) the semantic match criterion in which the cosine similarity score is required to exceed a threshold X to pass; and iii) the prohibited word or phrase criterion in which the presence of the specified word and/or phrase triggers a fail.

11. The computer program product of claim 8, wherein assigning the set of metadata to each pair of the reference set of inputs and output pairs further comprises:

assessing the set of metadata using a rules engine or classifier including at least one of: keyword evaluation to mark an input/output pair as sensitive content; and a topic classifier to assign the topic area.

12. The computer program product of claim 8, wherein the set of metadata comprises, prioritization, sensitive content and topic areas.

13. The computer program product of claim 8, wherein automatically initiating the workflow further comprises routing the workflow to at least one user selected from an administrator, a data scientist, risk management personnel, and an internal auditor, and wherein the workflow is reviewed to determine whether the actual output is within specification under the evaluation criteria or whether the model of the LLM is to be fine-tuned.

14. The computer program product of claim 8, wherein associating the set of metadata to the set of evaluation criteria can include, a high priority is associated to exact match, a low priority and low sensitivity content are required a semantic match and sensitive contents must not contain a certain letter and/or phrase.

15. A computer system for governing responses generated by a language learning model (LLM), the computer system comprising:

one or more computer processors;

one or more computer readable storage media; and program instructions stored on the one or more computer readable storage media for execution by at least one of the one or more computer processors, the program instructions comprising the steps of:

setting up an initial risk assessment framework for a model of an LLM in a question repository, wherein setting up further comprises:

defining a reference set of inputs and output pairs for the LLM wherein the reference set of inputs and output pairs are actual inputs and reference outputs; defining a set of metadata associated with the reference set of inputs and output pairs, wherein the set of metadata including at least prioritization, sensitive-content designation, and topic area;

assigning the set of metadata to each pair of the reference set of inputs and output pairs;

defining a set of evaluation criteria including (i) an exact match criterion computed using a normalized Damerau-Levenshtein score, (ii) a semantic match criterion computed using a cosine similarity score, and (iii) a prohibited word or phrase criterion determined by detecting presence of a specified word and/or phrase; assigning the set of evaluation criteria to an organizational risk framework;

and associating the set of metadata to the set of evaluation criteria; evaluating the initial risk assessment framework and the model of the LLM after a predetermined interval, further comprising:

passing all inputs from the reference set of inputs and output pairs to the LLM, and collecting all outputs from the reference set of inputs and output pairs at a predetermined interval;

evaluating and producing an evaluation metric of all the inputs and all of the outputs based on one or more policies, further comprising:

generating new outputs and comparing the new outputs against the reference set of inputs and output pairs; and generating scores for the new outputs and adding the scores to a historical data for future analysis;

summarizing results of the evaluation metric across all of the reference set of inputs and output pairs; and notifying one or more users when the results of the evaluation metric exceed a predetermined metric threshold; responsive to determining that the evaluation metric exceeds the predetermined metric threshold, automatically initiating, in a governance risk and compliance (GRC) system, a workflow that includes the actual input, the reference output, actual output and confidence score for review; and saving data associated with the result of the evaluation metric and all of the reference set of inputs and output pairs to a data repository for trend analysis.

16. The computer system of claim 15, wherein the predetermined interval comprises every hour or every week.

17. The computer system of claim 15, wherein the set of evaluation criteria further comprises (i) the exact match criterion in which the normalized Damerau-Levenshtein score is required to equal 1.0 to pass;

(ii) the semantic match criterion in which the cosine similarity score is required to exceed a threshold X to pass; and (iii) the prohibited word or phrase criterion in which the presence of the specified word and/or phrase triggers a fail.

18. The computer system of claim 15, wherein assigning the set of metadata to each pair of the reference set of inputs and output pairs further comprises:

assessing the set of metadata using a rules engine or classifier including at least one of:

keyword evaluation to mark an input/output pair as sensitive content; and a topic classifier to assign the topic area.

19. The computer system of claim 15, wherein the set of metadata comprises, prioritization, sensitive content and topic areas.

20. The computer system of claim 15, wherein automatically initiating the workflow further comprises routing the workflow to at least one user selected from an administrator, a data scientist, risk management personnel, and an internal auditor, and wherein the workflow is reviewed to determine whether the actual output is within specification under the evaluation criteria or whether the model of the LLM is to be fine-tuned.

* * * * *